(12) United States Patent
Machida et al.

(10) Patent No.: US 8,085,391 B2
(45) Date of Patent: Dec. 27, 2011

(54) INTEGRATED OPTICAL CHARACTERISTIC MEASUREMENTS IN A CMOS IMAGE SENSOR

(75) Inventors: Akihiro Machida, Sunnyvale, CA (US); William George Gazeley, Corvallis, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 1181 days.

(21) Appl. No.: 11/832,822

(22) Filed: Aug. 2, 2007

(65) Prior Publication Data
US 2009/0033788 A1 Feb. 5, 2009

(51) Int. Cl.
*G01B 9/00* (2006.01)
(52) U.S. Cl. ..................... 356/124; 356/124.5
(58) Field of Classification Search ........... 356/124, 356/124.5; 250/216, 208.1; 359/708, 652, 359/619, 641, 618; 257/292, 432
See application file for complete search history.

(56) References Cited

U.S. PATENT DOCUMENTS

| | | | |
|---|---|---|---|
| 6,838,715 B1 | 1/2005 | Bencuya et al. | |
| 7,023,472 B1 | 4/2006 | Kang et al. | |
| 7,214,920 B2 | 5/2007 | Gazeley | |
| 7,427,742 B2 * | 9/2008 | Drowley et al. | 250/216 |
| 7,453,653 B2 * | 11/2008 | Dowski et al. | 359/708 |
| 7,564,629 B1 * | 7/2009 | Feng | 359/619 |
| 7,616,317 B2 * | 11/2009 | Misener et al. | 356/446 |
| 7,763,918 B1 * | 7/2010 | Feng et al. | 257/292 |
| 7,768,709 B2 * | 8/2010 | Froehlich et al. | 359/641 |
| 2003/0052987 A1 | 3/2003 | Li et al. | |
| 2005/0030383 A1 | 2/2005 | Li | |
| 2005/0236553 A1 | 10/2005 | Noto et al. | |
| 2006/0125945 A1 | 6/2006 | Suzuki | |
| 2006/0204128 A1 | 9/2006 | Silverstein | |
| 2006/0209292 A1 | 9/2006 | Dowski, Jr. et al. | |
| 2006/0249654 A1 | 11/2006 | Silsby et al. | |
| 2006/0268131 A1 | 11/2006 | Cutler | |
| 2007/0030379 A1 | 2/2007 | Agranov | |
| 2007/0076101 A1 | 4/2007 | Baer | |

FOREIGN PATENT DOCUMENTS

| | | |
|---|---|---|
| GB | 2 425 887 A | 11/2006 |
| JP | 2003-163826 | 6/2003 |
| JP | 2005-277963 | 10/2005 |
| KR | 2003 0087471 | 11/2003 |
| KR | 2004-0073378 | 8/2004 |
| WO | WO 2006/028876 A1 | 3/2006 |
| WO | WO 2007/042853 A1 | 4/2007 |

OTHER PUBLICATIONS

A. Theuwissen, "Image Processing Chain in Digital Still Cameras", IEEE, 2004. pp. 2-5.
W. Yu, "Practical Anti-vignetting Methods for Digital Cameras", IEEE, 2004, pp. 975-983.
P. B. Catrysse et al., "Optical Efficiency of Image Sensor Pixels", Optical Society of America vol. 19, No. 8, Aug. 8, 2002, pp. 1610-1620.

* cited by examiner

*Primary Examiner* — Sang Nguyen
(74) *Attorney, Agent, or Firm* — RatnerPrestia

(57) ABSTRACT

Methods and systems for forming a chief ray angle (CRA) profile of an imaging lens having a field of view (FOV) are provided. At least one CRA sensor is positioned between an edge of a pixel array and an edge of the FOV, at one or more predetermined lens height percentages. Light is transmitted through the imaging lens and detected by multiple detectors included in the at least one CRA sensor. Each detector is configured to detect a different predetermined CRA. For each CRA sensor, a largest amplitude of detected light among the multiple detectors is selected. The largest amplitude of light represents a CRA of the transmitted light. At least one data point of the CRA profile is determined, by using the selected predetermined CRA at the one or more predetermined lens height percentages.

12 Claims, 8 Drawing Sheets

INTEGRATED OPTICAL CHARACTERISTIC MEASUREMENTS IN A CMOS IMAGE SENSOR

FIELD OF THE INVENTION

The present invention relates to CMOS imagers and, more particularly, to methods and apparatus for determining a lens profile of an imaging lens.

BACKGROUND OF THE INVENTION

Image sensors find applications in a wide variety of fields, including machine vision, robotics, guidance and navigation, automotive applications and consumer products. In many smart image sensors, it is desirable to integrate on-chip circuitry to control the image sensor and to perform signal and image processing on the output image. Charge-coupled devices (CCDs), which have been one of the dominant technologies used for image sensors, however, do not easily lend themselves to large scale signal processing and are not easily integrated with complimentary metal oxide semiconductor (CMOS) circuits.

CMOS image sensors receive light into an imaging array including a photosensitive pixel array. One of the difficulties in designing imaging systems is in the optimization of individual pixels within the pixel array. The problem becomes significant in imaging applications receiving non-telecentric light, where different pixels of the array are illuminated with light having different chief ray angles (CRAs). Examples of non-telecentric light sources include cameras for cellular phones and imaging handsets.

If the incident light is provided perpendicular to the CMOS image sensor (corresponding to a CRA of about 0°), the sensor has full sensitivity to the incoming light. However, if the incident light is provided at an angle (i.e. where the CRA angle is greater than 0°), the image sensor may not capture all the light. For example, in non-telecentric applications, pixels at the corner of the imaging array may typically receive light with CRAs up to about 30°. In addition, the relative illumination of the imaging lens results in large (up to about 50%) degradation of light intensity across the array. The signals output from pixels at an edge of the array may be significantly degraded. A mismatch between an acceptance angle for the incident light and the incident ray angle may cause vignetting (i.e. a corner darkness effect or shading effect) to occur.

Obtaining an optimized imaging array is becoming increasingly important as technology tends towards producing a reduced pixel size along with an increased image quality. In addition, many imaging lenses for mobile applications, such as cellular telephones, have a significant non-linear dependence on the CRA which is a function of the positions of pixels in the pixel array. Accordingly, there is an interest in determining a profile of chief ray angles in order to optimize the imaging array and optimize signal processing correction parameters.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

In the following detailed description, reference is made to the accompanied drawings which form a part hereof and which illustrates specific embodiments of the present invention. These embodiments are described in sufficient detail to enable those of ordinary skill in the art to make and use the invention. It is also understood that structural, logical or procedural changes may be made to the specific embodiment disclosed without departing from the spirit and scope of the present invention.

The term "pixel" as used herein, refers to a photoelement unit cell containing a photosensor device and associated structures for converting photons to an electrical signal. For purposes of illustration, a representative 3 color R,G,B pixel array (representing red, green and blue color filters) is described herein. The invention, however, is not limited to the use of a R,G,B array and may be used with other color arrays, one example being C,M,Y,K (representing cyan, magenta, yellow and black color filters). The invention may also be used in a mono-chromatic array where just one color is sensed by the array.

It should be understood that, taken alone, a pixel does not distinguish one incoming color of light from another and its output signal represents the intensity of received light, not any indication of color. For purposes of this disclosure, however, pixels will be referred to by color (i.e., "red pixel", "blue pixel", etc.) when a color filter is used in connection with the pixel to focus a particular wavelength of light, corresponding to a particular color, onto the pixel. For example, when the term "red pixel" is used herein, it is referring to a pixel associated with a red color filter that filters wavelengths of light within a wavelength range encountered at about 650 nm before reaching the underlying pixel. Similarly, wavelength ranges exist for the "blue" and "green" pixels which are centered about respective blue and green wavelengths.

Figure 1:
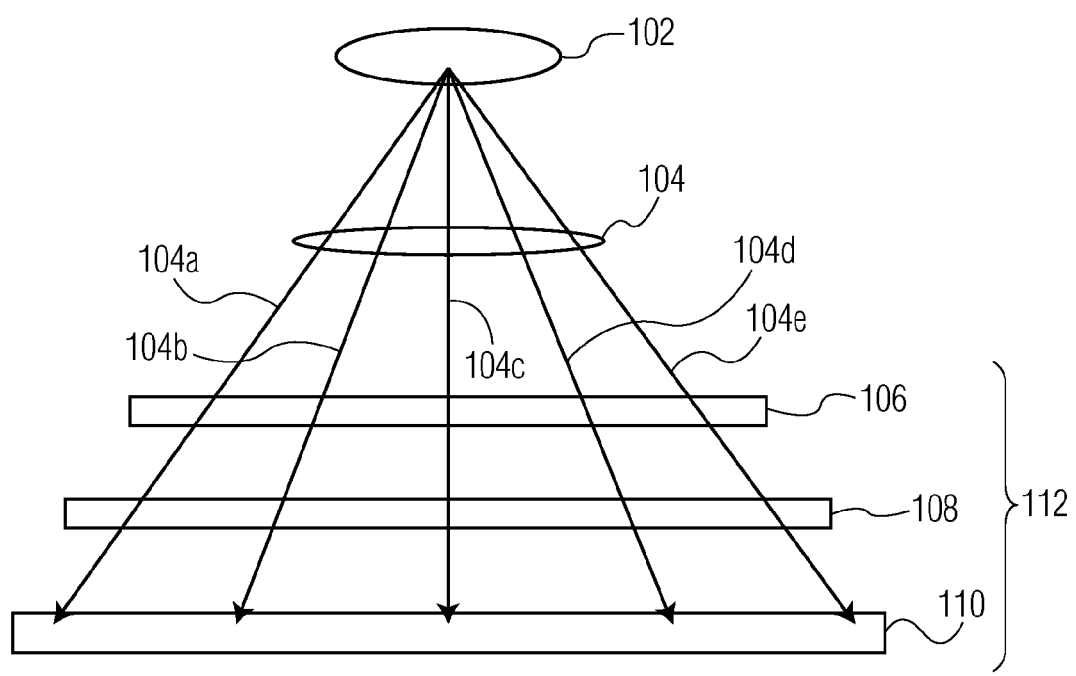
FIG. 1 is a block diagram illustrating a relationship between an imaging lens and an imaging array for incoming light at various angles.

FIG. 1 is a cross section diagram of imaging lens 102 and imaging array 112 with respect incoming light 104. As shown in FIG. 1, imaging array 112 includes microlens array 106, color filter array 108 and pixel array 110. Incoming light 104 is produced from imaging lens 102 such that individual rays of light 104a, 104b, 104c, 104d and 104e strike pixel array 110 at different angles. Color filter array 108 can block incoming light of a particular color(s) from reaching the photosensitive portion of the corresponding pixels.

If the incoming light 104 is provided perpendicular to imaging array 112, the photosensitive portions of pixel array 110, microlens array 106 and color filter array 108 may be arranged to have their centers substantially aligned. In practice, microlens array 106 and color filter array 108 are typically shifted with respect to each other, to focus incoming light 104 onto respective underlying, photosensitive regions of pixel array 110. Any remaining signal degradation, such as signal degradation due to differences in illumination of the imaging lens, may be compensated by using lens shading correction algorithms.

If a CRA profile (i.e. a chief ray angle as a function of lens height, described below) for imaging lens 102 is known, microlens array 106 and color filter array 108 may be shifted, in order to maximize incoming light 104 to each pixel. In addition, image processing may be used to compensate for any remaining shading effect. The CRA profile for each imaging lens 102, however, may differ, for example, because of differences in the manufacturing process.

Figure 2:
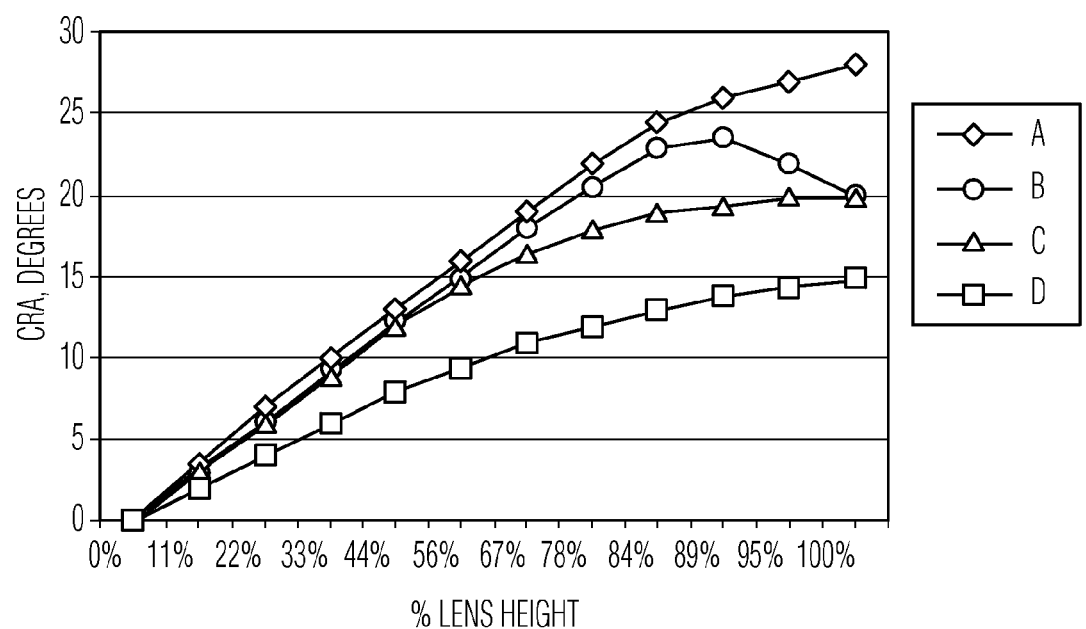
FIG. 2 is a graph illustrating chief ray angles as a function of lens height for typical imaging lenses.

FIG. 2 illustrates several typical CRA profiles. The CRA, in degrees, is shown as a function of a percentage of lens height. For example, 0% corresponds to a pixel having a center located at the center of imaging array 112 and 100% corresponds to a pixel located furthest away from the center or to a pixel located at the edge of a field of view (FOV) of imaging lens 102. As shown in FIG. 2, the CRA profile is typically non-linear. A lens manufacturer may provide a corner CRA, for example, 25° at 100% lens height, where the corner CRA may not be the maximum CRA in the profile. This makes shading correction difficult for various lens heights.

Figure 3A:
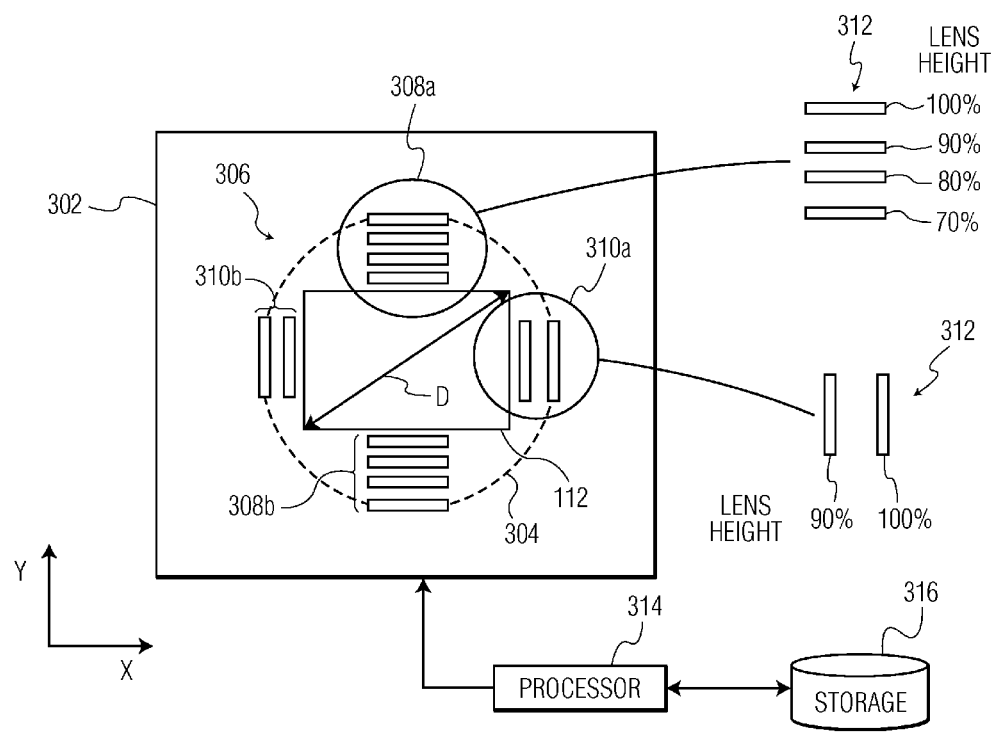
FIG. 3 is a block diagram illustrating a lens profile detection system according to an embodiment of the invention.
Figure 3B:
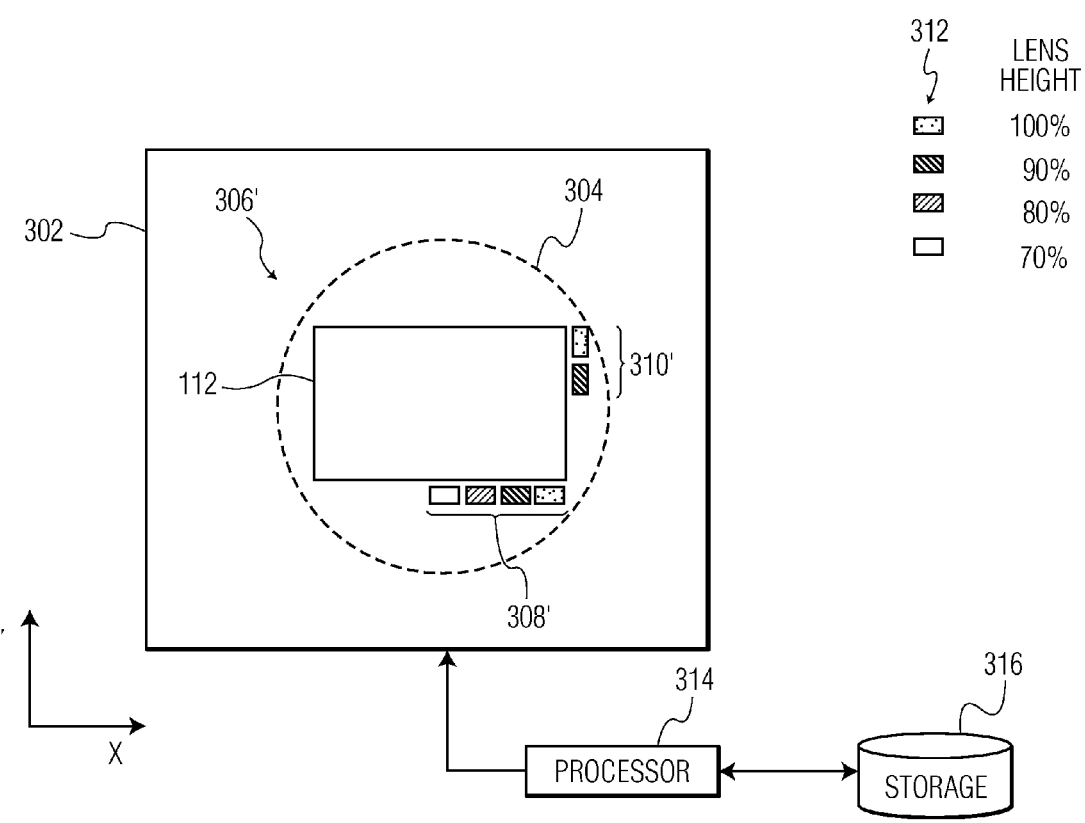

FIG. 3 is a block diagram of a lens profile detection system, designated generally as 306, provided along at least one edge of imaging array 112 on substrate 302. Imaging lens 102 provides incoming light 104 (not shown in FIG. 3) within field of view (FOV) 304. Imaging array 112 is shown as a rectangular array. It is understood, however, that imaging array 112 may be a square or any other suitable shape.

Lens profile detection system 306 may include one or more lens profile detectors, designated generally as 308 for detectors provided along the Y-axis and 310 for detectors provided along the X-axis. Lens profile detection system 306 may include, for example, one lens profile detector, such as 308b, or any combination of two or more lens profile detectors 308 and/or 310 arranged between an edge of imaging array 112 and the edge of FOV 304.

The focal center of imaging lens 102 may vary as a function of time because of an auto-focus feature provided for imaging lens 102. Mechanical mechanisms of the auto-focus feature may cause imaging lens 102 to move, causing variation in the focal center. In addition, imaging lens 102 may be subject to a lens tilt in one or more directions. The lens tilt may cause a color imbalance in the pixels. Such a color imbalance typically occurs with the blue and red pixels. Lens tilt typically occurs along a diagonal line of imaging array 112, particularly along diagonal line D.

Along diagonal line D, a difference in the chief ray angle becomes significant for the blue and red pixels, because of the unbalanced arrangement of the blue and red pixels in a Bayer pattern. Along the remaining diagonal line (not shown), the red and blue pixels are arranged in a substantially equal distance to each other in the Bayer pattern and thus are not prone to a color imbalance.

Lens profile detection system 306 is positioned to correspond to at least one lens height percentage, relative to a pixel located at the center of imaging array 112. Lens profile detection system 306 is configured to receive incident light 104 from imaging lens 102 and estimate at least one data point (i.e. a CRA) on a CRA profile, based on the corresponding lens height of lens profile detection system 306. As described further below, a number and arrangement of lens profile detectors 308 and/or 310 may be used to determine a lens tilt shift in one direction, a lens center shift in one direction, a lens center in the X and Y directions and/or a lens tilt in the X and Y directions In one embodiment, the determined CRA profile may be used in a calibration process to optimize arrangement of microlens array 106 and color filter array 108, and provide initial image processing parameters for shading correction. Accordingly, lens profile detection system 306 may be appropriately positioned on substrate 302 and at least one CRA profile may be determined, as described herein. Imaging array 112 may be optimized according to the determined CRA profile and appropriately positioned on substrate 302. In another embodiment, the CRA profile may be updated during the life cycle of the CMOS imaging sensor for image processing correction. For example, optical characteristics of imaging lens 102 may change over time and/or lighting conditions may vary, which may produce nonoptimal image processing correction, if the CRA profile is not updated.

Each lens profile detector 308, 310 may include one or more CRA sensors 312 positioned on substrate 302 to correspond to a lens height percentage. In FIG. 3, a 100% lens height corresponds to CRA sensor 312 at the edge of FOV 304. For example, lens profile detector 308a includes four CRA sensors 312 corresponding to lens height percentages of 70%, 80%, 90% and 100%. Lens profile detector 310a includes two CRA sensors 312 corresponding to lens height percentages 90% and 100%. In this example, because imaging array 112 is rectangular, two CRA sensors are positioned along the X-axis, whereas four CRA sensors are shown positioned along the Y-axis. It is understood that any suitable number of CRA sensors 312 may be used within lens profile detectors 308, 310 according to the size and/or shape of the imaging array and the size of field of view 304.

Figure 6:
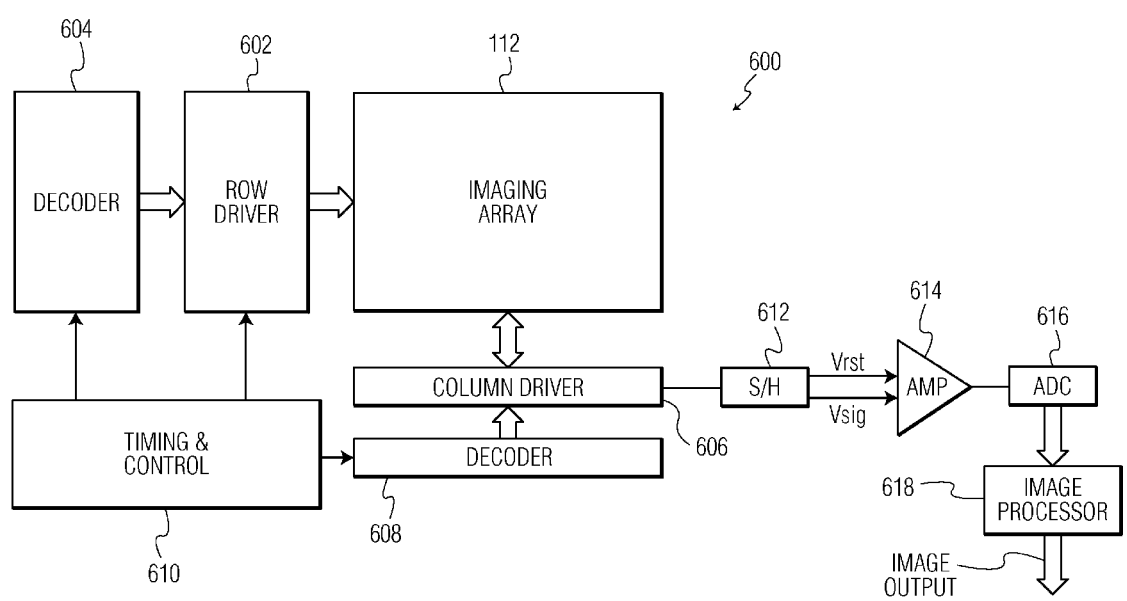
FIG. 6 is a block diagram of an image sensor.

Lens profile detection system 306 may also include processor 314 and storage 316. Processor 314 may determine the CRA profile from lens profile detectors 308 and/or 310 and store the CRA profile in storage 316. Processor 314 may correspond to image processor 618 of imaging device 600 (FIG. 6). In another embodiment, lens profile detection system 306 may be externally connected to processor 314 and storage 316 where processor 314 and storage 316 are part of a calibration system (not shown). The CRA profile stored in storage 316 may be used to adjust the microlens array 106, color filter array 108, as well as provide shading correction.

Processor 314 may include any electronic components and any software suitable for determining a CRA profile. Storage 316 may be an internal memory or an external memory on a remote device.

Figure 4:
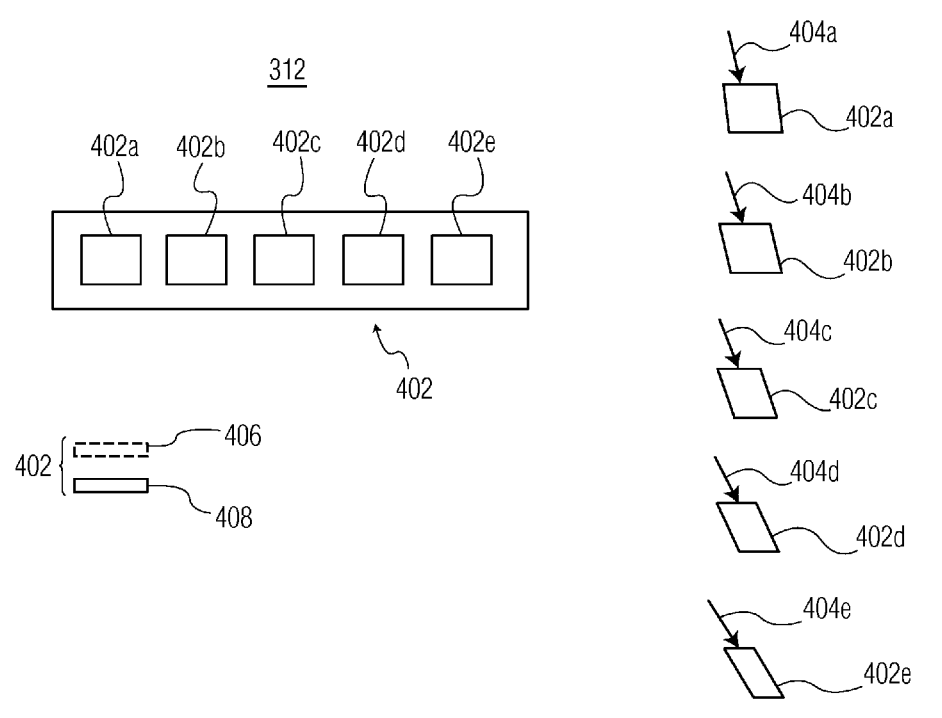
FIG. 4 is a block diagram illustrating a CRA sensor according to an embodiment of the invention.

FIG. 4 is a block diagram of a CRA sensor 312 used as part of lens profile detector 308, 310. CRA sensor 312 may include one or more detectors such as detectors 402a, 402b, 402c, 402d and 402e. Each detector 402 is configured to detect light at a predetermined incidence angle such as incidence angles 404a, 404b, 404c, 404d and 404e. A number of detectors 402 may be used to estimate the CRA at the lens height position of corresponding CRA sensor 312. For example, detectors 402a, 402b, 402c, 402d and 402e may be used to detect light at respective predetermined incidence angles of 10°, 15°, 20°, 25° and 30°. In each CRA sensor 312, the predetermined incidence angle of the detector that receives the maximum amount of light may be selected as the CRA. It is understood that any suitable number of angle detectors 402 configured for any predetermined incidence angles may be used to estimate the CRA.

Each detector 402 includes one or more pixels 408 and may, optionally, include color filter array 406. Color filter array 406 may include one or more color filters which may be monochromatic or combinations of R,G,B color filters. In one embodiment, each detector 402 may include, for example, 1 to 5 pixels, depending upon whether color filter array 406 is included. For example, if an R,G,B color filter is used, each detector 402 may include a minimum of 3 pixels. If there are 5 detectors 402 each having 5 pixels, for example, then, 25 pixels may be included in CRA sensor 312. It is understood that any number of pixels 408 may be used with detector 402.

In one embodiment, lens profile detector 308 may include two CRA sensors 312 positioned across imaging array, for example, lens profile detectors 308a and 308b. Each CRA sensor 312 may include a single pixel 408 configured to detect an amount of light, without being configured for a predetermined incidence angle (i.e. without estimating a CRA). A difference between analog values from respective pixels 408 of lens profile detectors 308a and 308b may be used to determined whether there is an imbalance of light across imaging array 112 with respect to the Y-direction. A difference in values from pixels 408 of lens profile detectors 310a, 310b may be used to determine an imbalance of light in the X-direction.

Color filter array 406 may be used to detect a variation in color for the estimated CRA. Typically, imaging lens 102 includes an infrared (IR) cut-off filter, which is a thin film coating, to substantially block transmission of infrared light. The coating, however, has dichroic characteristics such that it may block infrared light and transmit red, blue, and green light equally, when the incoming light is perpendicular to imaging array 112. As the incoming light is incident at more than 20°, however, the color transmission varies through the coating, and a shift in color, typically with respect to red, occurs. For example, light with a wavelength of about 650 nm (red light) is shifted to a wavelength of about 620 nm (approaching orange light). Accordingly, color filter array 406 may include a red color filter. A difference in an amount of detected red light for the estimated CRA, for example, across imaging array 112 in the X-direction, may be used to detect an imbalance in red light. It is understood that any suitable color filter array 406 may be used to detect variation in color for the estimated CRA.

In one embodiment, detector 402 may be configured for predetermined incidence angle 404 by appropriately shifting color filter array 406 to correspond to the predetermined incidence angle 404. For example, centers of color filter array 406 may be shifted with respect to pixels 408, to direct incoming light onto respective underlying photosensitive regions of pixels 408 at predetermined incidence angle 404. In another embodiment detector 402 may also include a microlens array (not shown). Accordingly, a microlens array may be appropriately shifted with respect to pixels 408 (as well as optional color filter array 406) to direct incoming light onto respective underlying photosensitive regions of pixels 408 at predetermined incidence angle 404. In another embodiment, metal layers that are used to form pixel 408 may be arranged tilted at predetermined incidence angle 404 in order to detect the incoming light on the photosensitive region at predetermined incidence angle 404. For example, see U.S. Pat. No. 7,214,920 to Gazeley, entitled "Pixel with Spatially Varying Metal Route Positions." It is contemplated that detector 402 may be configured by any suitable process such that detector 404 is capable of detecting the amount of light at predetermined incidence angle 404.

Each detector 402 generates a number of analog signals corresponding to a number of pixels 408. Each analog signal represents the amount of light detected at a corresponding incidence angle 404 (including for different color filters of optional color filter array 406). Within each CRA sensor 312, processor 314 (FIG. 3) may estimate the CRA from among detectors 402, having corresponding predetermined incidence angles 404, that receives the maximum amount of light.

The CRA is thus estimated from the predetermined incidence angle 404 associated with the maximum amount of light. Accordingly, each CRA sensor 312 determines a data point of the CRA profile, using the estimated CRA. Each lens profile detector 308 and/or 310, processor 314 then determines the CRA profile using the estimated CRA for each lens height percentage.

Figure 5:
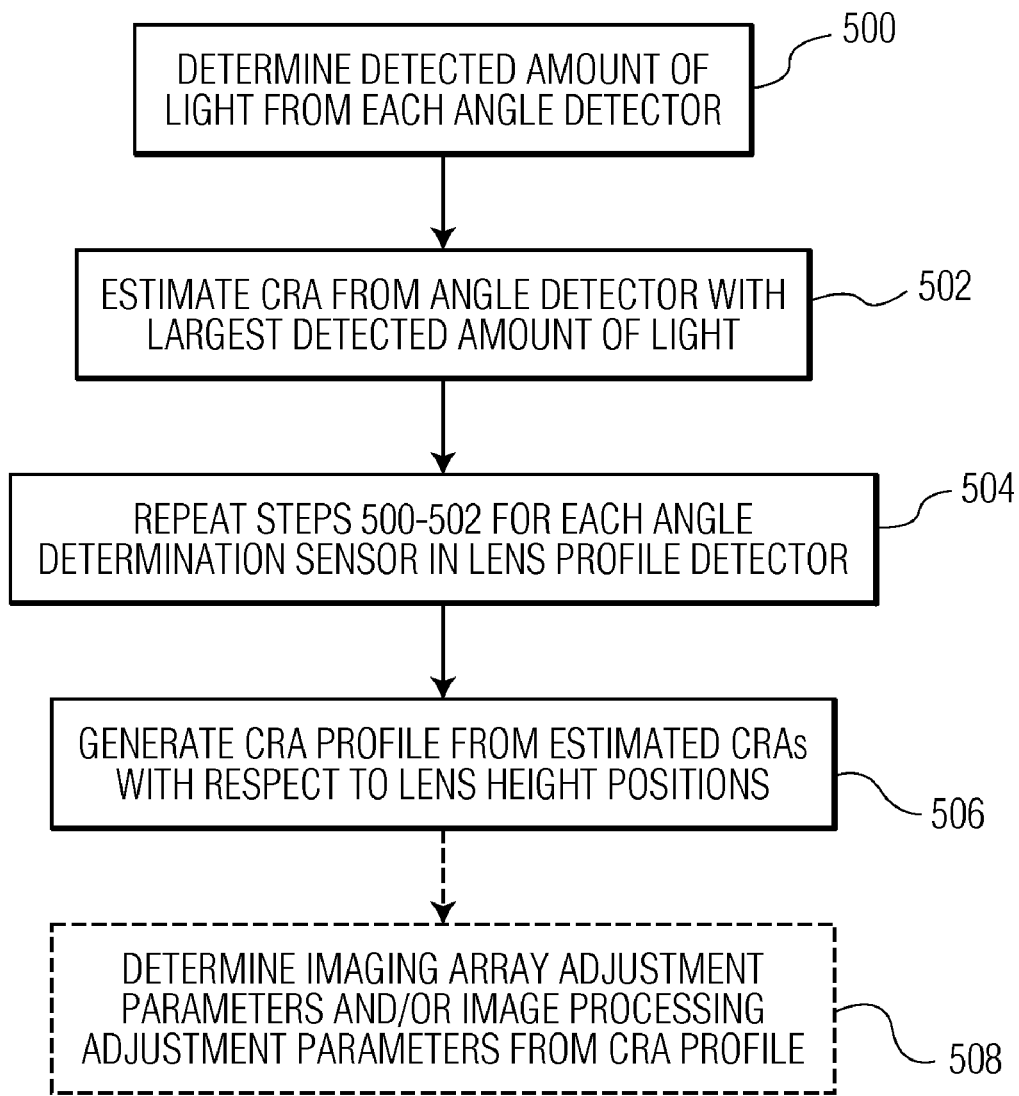
FIG. 5 is a flow chart illustrating a method for determining a lens profile according to an embodiment of the invention.

FIG. 5 is a flowchart illustrating a method of determining a CRA profile. In step 500, the amount of light from each detector 402 is determined. In step 502, a CRA is estimated by processor 314 (FIG. 3) from incidence angle 404 of detector 402 receiving the largest amount of detected light.

In step 504, steps 500-502 are repeated for each CRA sensor 312 within a lens profile detector, for example, lens profile detector 308a (FIG. 3) to determine data points of the CRA profile. In step 506, a CRA profile for a lens profile detector is generated from the estimated CRAs at the corresponding lens height percentages associated with the respective CRA sensors 312 (FIG. 3).

It is understood that steps 500-506 are repeated for a number of lens profile detectors 308 and/or 310. In optional step 508, imaging array adjustment parameters and/or signal processing correction factors may be determined from one or more CRA profiles associated with respective lens profile detectors 308 and/or 310, for example, by processor 314 (FIG. 3). A calibration system (not shown) may optimize imaging array 112, by an appropriate shift in microlens array 106 and/or color filter array 108, based on the imaging array adjustment parameters. Image processor 618 (FIG. 6) may use the signal processing correction factors to perform shading correction.

If more than one lens profile detector is used, for example, two lens profile detectors 308a and 308b, a CRA profile may be determined for each lens profile detector by repeating steps 500-506. A difference between the CRA profiles of lens profile detectors 308a and 308b may be used, to detect a shift in the focal center of imaging lens 102 in the Y-direction. A difference between CRA profiles of two lens profile detectors arranged on different axes, such as lens profile detectors 310a and 308b, may be used determine a shift in the focal center and a shift in the lens tilt along diagonal line D.

In another embodiment, a difference between CRA profiles of three lens profile detectors, such as lens profile detectors 308a, 308b and 310a, may be used in order to determine the focal center (i.e. in the X- and Y-directions), as well as a shift in the lens tilt, along diagonal line D or across imaging array 112. In a further embodiment, a difference between CRA profiles of four lens profile detectors, as shown in FIG. 3, may be used to determine the focal center and the lens tilt across the X- and Y-axes of imaging array 112.

FIG. 6 is a block diagram of CMOS imaging device 600, i.e. an image sensor, including imaging array 112. Pixel array 110 of imaging array 112 includes a plurality of pixels arranged in a predetermined number of columns and rows. The pixels of each row in the array are turned on at the same time by a row select line and the pixels of each column are selected for output by a column select line. A plurality of row and column lines are provided for the entire array.

The row lines are selectively activated by row driver 602 in response to row address decoder 604 and the column select lines are selectively activated by column driver 606 in response to column address decoder 608. Thus, a row and column address is provided for each pixel. The CMOS imaging device 600 is operated by control circuit 610, which controls address decoders 604, 608 for selecting the appropriate row and column lines for pixel readout, and row and column driver circuitry 602, 606, which apply driving voltages to the drive transistors of the selected row and column lines.

Each column of the array contains sample and hold circuitry (S/H) 612 including sample and hold capacitors and switches associated with column driver 606 that read and store a pixel reset signal Vrst and a pixel image signal Vsig for selected pixels. A differential signal (Vrst-Vsig) is produced by differential amplifier 614 for each pixel, which is digitized by analog-to-digital converter 616 (ADC). The analog-to-digital converter 616 supplies the digitized pixel signals to image processor 618, which forms and outputs a digital image.

Figure 7:
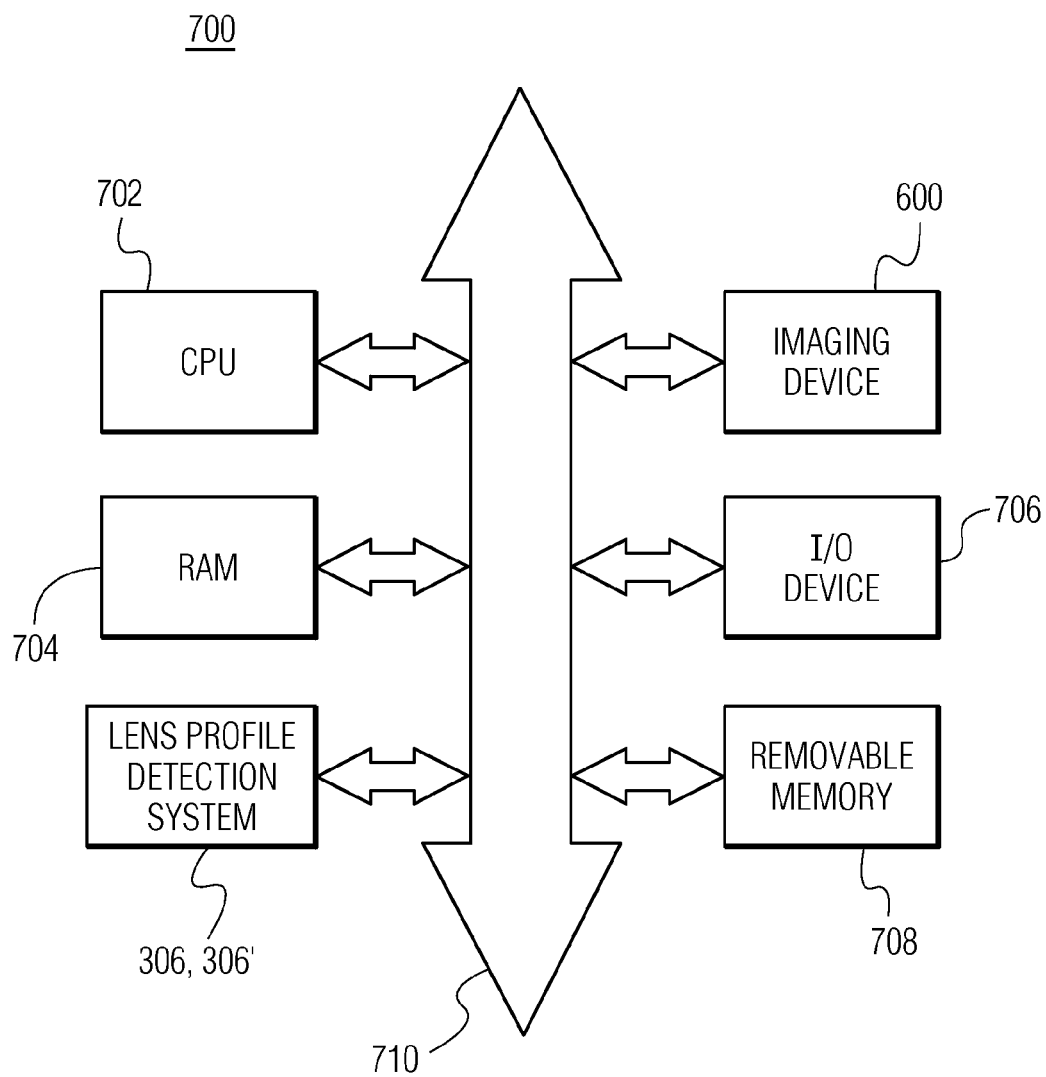
FIG. 7 is a block diagram of a processing system incorporating an imaging device and a lens profile detection system in accordance with an embodiment of the invention.

FIG. 7 shows a typical processor-based system, designated generally as 700, which is modified to include lens profile detection system 306. The processor-based system 700, as shown, includes central processing unit (CPU) 702 which communicates with input/output (I/O) device 706, imaging device 600 and lens profile detection system 306 over bus 710. The processor-based system 700 also includes random access memory (RAM) 704, and removable memory 708, such as a flash memory. At least a part of lens profile detection system 306, CPU 702, RAM 704, and imager device 600 may be integrated on the same circuit chip.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for forming a chief ray angle (CRA) profile of an imaging lens having a field of view (FOV) oriented toward a pixel array, the method comprising the steps of:
    positioning at least one CRA sensor (a) between an edge of the pixel array and an edge of the FOV, and (b) at one or more respective predetermined lens height percentages from a pixel located at a center of the pixel array to form a lens profile detector;
    transmitting light through the imaging lens toward the pixel array;
    detecting the transmitted light by multiple detectors included in the at least one CRA sensor, wherein each detector is configured to detect a different predetermined CRA;
    for each CRA sensor, selecting a largest amplitude of light detected by the multiple detectors, wherein the largest amplitude of light represents a CRA of the transmitted light;
    determining, by a processor, at least one data point of the CRA profile, using the predetermined CRA selected as having the largest amplitude at the corresponding one or more predetermined lens height percentages;
    forming at least one other lens profile detector between one or more other edges of the pixel array and the edge of the FOV;
    repeating the steps of detecting the transmitted light, selecting the largest amplitude of light and determining the at least one data point for one or more other CRA profiles corresponding to the at least one other lens profile detector;
    measuring at least one difference between the CRA profile and the one or more other CRA profiles; and
    determining at least one of a tilt of the imaging lens in at least one direction or an offset of a center of the imaging lens in at least one direction based on the measured at least one difference.

2. The method of claim 1, including the step of:
    placing multiple filter types on top of the multiple detectors,
    wherein placement of each filter type with respect to a center of each detector determines the predetermined CRA for the corresponding detector.

3. The method of claim 1, including the step of:
    placing microlenses on top of the multiple detectors,
    wherein placement of each microlens with respect to a center of a each detector determines the predetermined CRA for the corresponding detector.

4. The method of claim 1, including the step of:
    transmitting further light through the imaging lens toward the pixel array;
    detecting the further transmitted light by the multiple detectors; and
    repeating the steps of selecting the largest amplitude of the light detected for each CRA sensor, and determining the at least one data point for the further transmitted light to update the CRA profile.

5. The method of claim 1, wherein each detector includes at least one color filter type, the transmitted light filtered by the at least one color filter type, and further including the steps of:
    for each lens profile detector, determining a respective amplitude of the filtered light for each selected predetermined CRA; and
    measuring at least one difference between the respective amplitudes of the filtered light of the lens profile detector and the filtered light of the at least one other lens profile detector.

6. A method for calibrating an imaging array used with an imaging lens having a field of view (FOV) oriented toward the imaging array, the method comprising:
    positioning at least one CRA sensor (a) between an edge of a pixel array and an edge of the FOV, and (b) at one or more respective predetermined lens height percentages from a pixel located at a center of the pixel array;
    transmitting light through the imaging lens toward the pixel array;
    for each CRA sensor, selecting a largest amplitude of the transmitted light detected from among multiple detectors configured to detect different respective predetermined CRAs, the largest amplitude of light representing a CRA of the transmitted light;
    determining, by a processor, at least one data point of a CRA profile using the selected predetermined CRA at the corresponding one or more lens height percentages; and
    adjusting, by the processor, at least one of a color filter array and a microlens array relative to a pixel array of the imaging array, based on the determined CRA profile;
    wherein the step of positioning at least one CRA sensor includes positioning at least one other CRA sensor between at least one other edge of the pixel array and the edge of the FOV,
    the steps of selecting the largest amplitude of light and determining the at least one data point are repeated for the at least one other CRA sensor to determine at least one other CRA profile, and
    the color filter array and the microlens array are adjusted based on at least one difference between the determined CRA profile and the determined at least one other CRA profile; and
    each detector includes at least one color filter type, the transmitted light filtered by the at least one color filter type, further including the steps of:

for each of the at least one CRA sensor and the at least one other CRA sensor, determining a respective amplitude of the detected filtered light for each selected predetermined CRA;

measuring at least one difference between the respective amplitudes of the filtered light of the lens profile detector and the detected filtered light of the at least one other lens profile detector; and determining a shading correction for the imaging array based on one or more of at least one difference between the determined CRA profile and the determined at least one other CRA profile or the at least one difference between the respective amplitudes of the detected filtered light.

7. The method of claim 6, including determining a shading correction for the imaging array based on the determined CRA profile.

8. A system for forming a chief ray angle (CRA) profile comprising:

a pixel array;

an imaging lens having a field of view (FOV) oriented toward the pixel array;

at least one CRA sensor, which is separate from the pixel array, positioned (a) between an edge of the pixel array and an edge of the FOV, and (b) at one or more respective predetermined lens height percentages from a pixel located at a center of the pixel array;

the at least one CRA sensor including multiple detectors, which are separate from detectors of the pixel array, each of the multiple detectors detector configured to detect light transmitted through the imaging lens at a different predetermined CRA, wherein at least one data point in the CRA profile is determined by a largest amplitude of light detected by the multiple detectors as representing a CRA at the corresponding one or more predetermined lens height percentages, and wherein the at least one CRA sensor forms a lens profile detector and the system includes at least one other lens profile detector positioned between at least one other edge of the pixel array and the edge of the FOV, wherein at least one data point in a further CRA profile is determined for the at least one other lens profile detector; and a processor configured to determine one or more of the at least one data point in the CRA profile, the at least one data point in the further CRA profile or a difference between the CRA profile and the further CRA profile.

9. The system of claim 8, wherein each detector includes at least one pixel configured to direct the transmitted light at the respective predetermined CRA toward a photosensitive region of the pixel.

10. The system of claim 8, wherein each detector includes at least one microlens placed on top of the detector, the at least one microlens positioned relative to a center of the detector based on the respective predetermined CRA.

11. The system of claim 8, wherein each detector includes at least one color filter type placed on top of the detector, the at least one color filter type positioned relative to a center of the detector based on the respective predetermined CRA.

12. The system of claim 11, wherein the at least one color filter includes a monochromatic color filter or multiple types of color filters.

* * * * *